US010278418B2

(12) United States Patent
Hartmann et al.

(10) Patent No.: US 10,278,418 B2
(45) Date of Patent: May 7, 2019

(54) SMOKING DEVICE INCORPORATING A BREAKABLE CAPSULE, BREAKABLE CAPSULE AND PROCESS FOR MANUFACTURING SAID CAPSULE

(71) Applicant: V. MANE FILS, Bar sur Loup (FR)

(72) Inventors: Didier Hartmann, Cannes la Bocca (FR); Jean-Michel Hannetel, Grasse (FR); Nathalie Coursieres, St Cezaire sur Siagne (FR); Jean Mane, Grasse (FR)

(73) Assignee: V. MANE FILS, Bar sur Loup (FR)

( * ) Notice: Subject to any disclaimer, the term of this patent is extended or adjusted under 35 U.S.C. 154(b) by 573 days.

(21) Appl. No.: 15/153,766

(22) Filed: May 13, 2016

(65) Prior Publication Data

US 2016/0249676 A1    Sep. 1, 2016

Related U.S. Application Data

(63) Continuation of application No. 14/058,746, filed on Oct. 21, 2013, now Pat. No. 9,339,060, which is a continuation of application No. 11/917,769, filed as application No. PCT/IB2006/002818 on Jun. 21, 2006, now Pat. No. 8,820,331.

(30) Foreign Application Priority Data

Jun. 21, 2005  (WO) ................ PCT/EP2005/008503
Aug. 5, 2005   (WO) ................ PCT/EP2005/009227

(51) Int. Cl.
| | | |
|---|---|---|
| A24D 3/06 | (2006.01) | |
| A24D 3/04 | (2006.01) | |
| A24D 3/14 | (2006.01) | |
| A24D 3/02 | (2006.01) | |
| B01J 13/04 | (2006.01) | |

(52) U.S. Cl.
CPC ............ *A24D 3/061* (2013.01); *A24D 3/0275* (2013.01); *A24D 3/048* (2013.01); *A24D 3/14* (2013.01); *B01J 13/046* (2013.01)

(58) Field of Classification Search
CPC ....... A61J 3/07; A61K 9/4816; A61K 9/4808; A61K 9/4833; A61K 9/50; A24D 3/048; A24D 3/061; A24D 3/0275; A24D 3/14; B01J 13/046
See application file for complete search history.

(56) References Cited

U.S. PATENT DOCUMENTS

| | | |
|---|---|---|
| 3,390,686 A | 7/1968 | Irby |
| 3,547,130 A | 12/1970 | Harlow et al. |
| 3,602,231 A | 8/1971 | Dock |
| 3,943,940 A | 3/1976 | Minami et al. |
| 4,350,679 A | 9/1982 | Mizuno et al. |
| 4,889,144 A | 12/1989 | Tateno et al. |
| 4,935,243 A | 6/1990 | Borkan et al. |
| 5,186,185 A | 2/1993 | Mashiko et al. |
| 5,342,626 A | 8/1994 | Winston et al. |
| 5,419,916 A | 5/1995 | Yamamoto et al. |
| 5,456,937 A | 10/1995 | Chalupa |
| 5,472,002 A | 12/1995 | Covarrubias |
| 5,595,757 A | 1/1997 | Kiefer et al. |
| 5,614,217 A | 3/1997 | Chiprich |
| 5,939,097 A | 8/1999 | Fusejima et al. |
| 6,325,859 B1 | 12/2001 | De Roos et al. |
| 6,352,719 B1 | 3/2002 | Brown et al. |
| 6,391,288 B1 | 5/2002 | Miyazawa et al. |
| 6,517,865 B2 | 2/2003 | Cade et al. |
| 6,602,996 B1 | 8/2003 | Sworn et al. |
| 6,627,236 B1 | 9/2003 | Barbeau et al. |
| 7,226,613 B2 | 6/2007 | Schleifenbaum et al. |
| 7,267,718 B2 | 9/2007 | Scott et al. |
| 7,578,298 B2 * | 8/2009 | Karles et al. .......... A24D 3/163 131/337 |
| 7,744,922 B2 | 6/2010 | Mane |
| 7,754,239 B2 | 7/2010 | Mane et al. |
| 2003/0211146 A1 | 11/2003 | Scott et al. |
| 2004/0074507 A1 | 4/2004 | MacAdam et al. |
| 2004/0191366 A1 | 9/2004 | Mangos et al. |
| 2004/0234590 A1 | 11/2004 | Mane et al. |

(Continued)

FOREIGN PATENT DOCUMENTS

| | | |
|---|---|---|
| DE | 19926714 | 8/2000 |
| EP | 0 039 879 | 11/1981 |

(Continued)

OTHER PUBLICATIONS

Journal of Japan Society of Pharmaceutical Machinery and Engineering, vol. 4, No. 2, 1995.
Research Report from the Central R&D Laboratory of the Japan Monopoly Corporation, "Research on physical properties of tobacco smoke (1st report), Transition of moisture into condensate phase and gas phase", 1964.
Abstracts of Presentations at Fiscal year 1989 Autumn Annual Meeting of the Society of Powder Technology, Japan, pp. 120-121, 1989.
"Rountine analytical cigarette-smoking machine—Definitions and standard conditions", International Standard ISO3308, Smoking Machine, 4th edition, Apr. 15, 2000, pp. 1-24.
Takashi Ochi, "Hydrocolloids in food processing", The Food Industry, 1991, vol. 34, No. 14, pp. 18-30.

(Continued)

*Primary Examiner* — Michael H. Wilson
*Assistant Examiner* — Dionne W. Mayes
(74) *Attorney, Agent, or Firm* — Young & Thompson

(57) ABSTRACT

A smoking device includes a recipient or able to receive burning products, preferably tobacco, and a filter element connected to the recipient, wherein the filter includes at least one breakable capsule, the capsule having a initial crush strength from 0.5 to 2.5 kp, and keeping a crush strength from 0.5 to 2.5 kp and a deformation of less than two third of its diameter prior to rupture after having been submitted to a smoking test. The invention is also relating to the capsule suitable for being incorporated in a smoking device, and to the process of manufacture of the capsule.

20 Claims, 2 Drawing Sheets

(56) References Cited

U.S. PATENT DOCUMENTS

| | | |
|---|---|---|
| 2004/0261807 A1 | 12/2004 | Dube et al. |
| 2005/0069579 A1 | 3/2005 | Kamaguchi et al. |
| 2005/0070409 A1 | 3/2005 | Deal |
| 2006/0174901 A1 | 8/2006 | Karles et al. |
| 2006/0233874 A1 | 10/2006 | Suzuki |
| 2006/0286282 A1 | 12/2006 | Kamaguchi et al. |

FOREIGN PATENT DOCUMENTS

| | | |
|---|---|---|
| EP | 0 292 949 | 11/1988 |
| EP | 0 464 324 | 1/1992 |
| EP | 0 513 603 | 11/1992 |
| EP | 0 722 721 | 7/1996 |
| EP | 1 072 259 | 1/2001 |
| EP | 1 598 080 | 11/2005 |
| EP | 2614730 | 7/2013 |
| JP | S60-12943 | 7/1988 |
| JP | S63-164858 | 7/1988 |
| JP | S63-170310 | 7/1988 |
| JP | 2709077 | 3/1989 |
| JP | 1-313421 | 12/1989 |
| JP | H427352 | 1/1992 |
| JP | 3112468 | 3/1992 |
| JP | 4-217029 | 8/1992 |
| JP | 1993112446 | 5/1993 |
| JP | H05-245366 | 9/1993 |
| JP | 7002654 | 1/1995 |
| JP | H07-196478 | 8/1995 |
| JP | 8-10313 | 1/1996 |
| JP | 8-26976 | 1/1996 |
| JP | 3879941 | 1/1997 |
| JP | H10925228 | 1/1997 |
| JP | H1067625 | 3/1998 |
| JP | 10-291928 | 11/1998 |
| JP | 10-328556 | 12/1998 |
| JP | 11-502839 | 3/1999 |
| JP | 11-155480 | 6/1999 |
| JP | 2000014377 | 1/2000 |
| JP | 199226714 | 8/2000 |
| JP | 2001507925 | 6/2001 |
| JP | 2001-278740 | 10/2001 |
| JP | 2003055219 | 2/2003 |
| JP | 2003-079351 | 3/2003 |
| JP | 2004105282 | 4/2004 |
| JP | 2004121181 | 4/2004 |
| JP | 2004-262774 | 9/2004 |
| WO | 00/72702 | 12/2000 |
| WO | 0200201 | 1/2002 |
| WO | 03/009711 A1 | 2/2003 |
| WO | 2003045166 | 6/2003 |
| WO | 03/084516 | 10/2003 |
| WO | 2005000044 | 1/2005 |

OTHER PUBLICATIONS

"Food Polysaccharide: Knowledge of Emulsification, Thickening and Gelatin", Saiwai Shobo Co., Ltd., First Edition, First Published Nov. 25, 2001, pp. 154-164, 206-207, 216-217, colophon.

Kozlowski et al., "A Color-Matching Technique for Monitoring Tar/Nicotine Yields to Smokers", Public Health Briefs, American Journal of Public Health, Jun. 1982, vol. 72, No. 6, pp. 597-599.

\* cited by examiner

SMOKING DEVICE INCORPORATING A BREAKABLE CAPSULE, BREAKABLE CAPSULE AND PROCESS FOR MANUFACTURING SAID CAPSULE

This invention relates to a smoking device incorporating a breakable capsule, more particularly to a filtered smoking device incorporating such a capsule in its filter element.

In this invention, the term "capsule" means a delivery system of a substance, said substance being hereinafter referred to as "the core", which is enclosed into a shell. The term "breakable capsule" refers to a capsule as hereabove defined, wherein the shell can be broken by means of a pressure to release the core, more specifically the shell can be ruptured under the pressure imposed by the smoker's fingers when the smoker wants to release the core of the capsule.

In the prior art, some smoking devices incorporating a breakable capsules are known. For example, US2004/0261807 describes a cigarette comprising a tobacco rod and a filter element connected to the tobacco rod, said filter having a cavity wherein a capsule is disposed. Said capsule comprises an outer gelatin shell, and an inner liquid composition including flavoring agents. The goal of US2004/0261807 is to make it possible for the smoker to break the capsule, during the combustion of the cigarette, to allow the release of the core of the capsule.

The gelatin capsule is a good storage capsule, but is sensitive to moisture, and may soften during the smoking time. This softening results in that the gelatin shell loses its breakability, i.e. its ability of being ruptured under the pressure imposed by the smoker's fingers when the smoker wants to release the core of the capsule. Typically, the gelatin capsule of the prior art has a very important deformation when placed in smoking moisture conditions, which prevents the smoker from breaking it through a pressure of his/her fingers.

The ability to rupture is measured through the crush strength to be exerted to rupture the capsule and through the deformation of the capsule when pressure is applied.

For the present invention, the crush strength at a dry state shall not exceed 2.5 kp: a crush strength of more than 2.5 kp appears too high to achieve the expected results.

There is therefore a need to build up new capsules having a crush strength of at most 2.5 kp and able to keep their breakability even when exposed to the moisture brought into the filter during the smoking.

The Applicant has now found that the incorporation of selected hydrocolloids in the outer shell of the capsule, and/or the coating of the outer shell by a moisture barrier layer, results in capsules keeping their ability to rupture within a smoking device even after exposition to the moisture brought in said smoking device by the smoker.

Thus, the invention relates to a smoking device comprising:
- a recipient including or able to receive burning products, preferably tobacco,
- a filter element which is connected to the recipient,
- wherein said filter comprises at least one breakable capsule, said capsule
    having a crush strength Ci of 0.5 to 2.5 kp,
    keeping a crush strength Cf of 0.5 to 2.5 kp and presenting a deformation of less than two third of its diameter prior to rupture after having been submitted to a smoking test A. (It is known from one skilled in the art that 1 kp is 9.8 N).

The recipient may be the rod of a cigarette, wherein the burning product is tobacco.

The initial crush strength Ci of the capsule is measured before smoking, by continuously applying a load vertically onto one particle until rupture using a LLOYD-CHATILLON Digital Force Gauge, Model DFIS 50, having a capacity of 25 Kg, a resolution of 0.02 Kg, and an accuracy of +/−0.15%. The force gauge is attached to a stand; the capsule is positioned in the middle of a plate that is moved up with a manual thread screw device. Pressure is then applied manually and the gauge records the maximum force applied at the very moment of the rupture of the capsule, (measured in Kg or in Lb). Rupture of the capsule results in the release of the core.

The smoking test A is performed on the smoking Machine HEINR BORGWALDT RM 4/cs. The cigarette containing breakable capsule is positioned on the smoking machine in the standard starting position. The adjustable parameters are set up as follows:
- Puff volume: 35 ml (as defined in internationally standard method for smoking machine)
- Puff period: 60 seconds
- Puff duration: 2 seconds
- Puff sweep time: 1.8 second
- Exhaust sweep time: 1 second The test is finished when the cigarette is completely smoked or after 7 or 8 puffs. The final crush strength Cf is measure after having completing the smoking test A, following the same measurement procedure as used for the measure of Ci.

The deformation of the capsule is also measured after smoking test A, just before the rupture of the capsule. The deformation corresponds to the difference between the capsule diameter and the width of the capsule when pressed to the limit of rupture.

According to one embodiment of the invention, the smoking device includes a capsule having a crush strength Ci of 0.6 to 2 kp, preferably of 0.8 to 1.2 kp and keeping a crush strength Cf in the range of 0.6 to 2 kp, preferably in the range of 0.8 to 1.2 kp when submitted to the smoking test A.

According to another embodiment of the invention, the deformation of the breakable capsule within the smoking device at the limit of rupture, before and after its submission to the smoking test. A, is less than 2 mm, preferably less than 1 mm.

According to a preferred embodiment of the invention, the capsule is such that it claps or makes an audible "pop", when ruptured.

Advantageously, the shell thickness of the capsule is 10-500 microns, preferably 30-150 microns, more preferably 50-80 microns; the outer diameter of the capsule is in the range of 2 to 8 mm, preferably 3 to 5 mm, more preferably 3.4 to 4.8, and even more preferably 3.5 to 4.5 mm; the ratio diameter of the capsule/thickness of the shell is in the range of 10 to 100, preferably 50 to 70.

The shell comprises at least one hydrocolloid selected from gellan gum, agar, alginates, carrageenans, pectins, arabic gum, ghatti gum, pullulan gum, mannan gum or modified starch, alone or as a mixture thereof or in combination with gelatin. The amount of said hydrocolloid(s) present in the shell is 1.5 to 95% w/w, preferably 4% to 75% w/w, and even more preferably 20% to 50% w/w of the total dry weight of the shell. In a preferred embodiment, the selected hydrocolloid is gellan.

In a preferred embodiment of the invention, when used in combination with at least another gelling agent, the weight ratio between gellan gum and the other gelling agent(s) is from 80/20 to 20/80, preferably 75/25 to 25/75, and even more preferably from 60/40 to 50/50.

According to another embodiment of the invention, the shell contains less than 80% gelatin, preferably less than 75% gelatin, and even more preferably less than 70% gelatin by weight of the total dry weight of the shell.

In an alternative embodiment of the invention, the capsule includes a moisture barrier coating. In this embodiment, the shell of the capsule is coated with at least one moisture barrier layer comprising at least one moisture barrier agent dispersed in an organic solvent or in an aqueous solution or suspension. In this embodiment, the shell can be made of any hydrocolloid, including gelatin which can even constitutes in that case the only gelling agent of the shell. But preferably, even with the presence of the hydrophobic coating, the shell comprises also an amount of gellan, or agar, or carragheenan or alginates, or arabic gum, or pectins, or pullulan gum or mannan gum sufficient to bring a certain resistance to moisture; in this case the shell may include 1.5 to 95% preferably 4% to 75% w/w, and even more preferably 20% to 50% w/w of the total dry weight of the shell of at least one hydrocolloid selected from the group consisting of gellan agar carragheenan and pullulan gum. According to another embodiment of the invention, the shell of the coated capsule includes gellan, or arabic gum, or pectines, or agar, or alginates, or carragheenan or ghatti gum, or pullulan gum or mannan gum or a mixture thereof, but does not include gelatin.

According to an embodiment, the weight of the shell is of between 8-50%, preferably 8-20%, more preferably 8-15% by weight/total weight of the capsule.

Advantageously, the at least one moisture barrier agent is at least one hydrophobic agent selected from those suitable for confectionery or pharmaceutical products, preferably selected from the group consisting of waxes, especially carnauba wax, candelilla wax or beeswax, carbowax, shellac (in alcoholic or aqueous solution), ethyl cellulose, hydroxypropyl methyl cellulose, hydroxypropylcellulose, latex composition, polyvinyl alcohol, or a combination thereof. More preferably, the at least one moisture barrier agent is ethyl cellulose or a mixture of ethyl cellulose and shellac.

According to another embodiment of the invention, the hydrophobic moisture barrier agent may be a combination of hydroxypropylmethylcellulose, plasticizer, microcrystalline cellulose and color or any other commercialized combination known under the name of Seppifilm from SEPPIC, or Opadry from COLORCON.

According to another embodiment of the invention, the hydrophobic moisture barrier agent is a filmogen gelling agent, preferably gellan gum itself.

The shell may further comprise at least one plasticizer, which may be glycerol, sorbitol, maltitol, triacetine or polyethylene glycol, or another polyalcohol with plasticizing properties, and optionally one acid of the monoacid, diacid or triacid type, especially citric acid, fumaric acid, malic acid, and the like. The amount of plasticizer ranges from 1% to 30% by weight, preferably from 2% to 15% by weight, and even more preferably from 3 to 10% by weight of the total dry weight of the shell.

The shell can advantageously comprise a coloring agent which renders easier the location of the capsule within the filter during the manufacturing process of filters. The coloring agent is preferably chosen among colorants and pigments.

Fillers can also be included in the composition of the shell; by filler is meant any suitable material that can increase the percentage of dry material in the external liquid phase and thus after co-extrusion in the obtained shell. Increasing the dry material amount in a shell results in solidifying the shell, and in making it physically more resistant. Preferably, the filler is selected from the group comprising starch derivatives such as dextrin, maltodextrin, cyclodextrin (alpha, beta or gamma), or cellulose derivatives such as hydroxypropylmethylcellulose (HPMC), hydroxypropylcellulose (HPC), methylcellulose (MC), carboxymethylcellulose (CMC), polyvinyl alcohol, polyols or mixture thereof. Dextrin is a preferred filler. The amount of filler in the shell is at most 98.5%, preferably from 25 to 95% more preferably from 40 to 80% and even more preferably from 50 to 60% by weight on the total dry weight of the shell.

The core of the capsule included within the smoking device of the invention may include a mixture of materials or products which are lipophilic or partially soluble in ethanol, or of molecules formulated as oil/water/oil emulsions.

According to a preferred embodiment of the invention, the core of a breakable capsule according to the invention represents by weight 50 to 92% of said capsule, preferably 80 to 92%, more preferably 85 to 92%.

The core of the capsule may include one or more lipophilic solvents conventionally used in the food, pharmaceutical or cosmetic industries. In a preferred embodiment, these lipophilic solvents may be triglycerides, especially medium chain triglycerides, and in particular triglycerides of caprylic and capric acid, or mixtures of triglycerides such as vegetable oil, olive oil, sunflower oil, corn oil, groundnut oil, grape seed oil, wheat germ oil, mineral oils and silicone oils. The amount of lipophilic solvent in the core of a capsule according to the invention is of the order of 0.01 to 90%, preferentially 25 to 75% by weight of the total weight of the capsule.

The core may also comprise one or more aromatic or fragrance molecules as conventionally used in the formulation of flavoring or fragrance compositions, preferably aromatic, terpenic and/or sesquiterpenic hydrocarbons, and more particularly essential oils, alcohols, aldehydes, phenols, carboxylic acids in their various forms, aromatic acetals and ethers, nitrogenous heterocycles, ketones, sulfides, disulfides and mercaptans which may be aromatic or non aromatic. The core may also comprise one or more molecules or extracts for cosmetic use.

The core may also comprise one or more fillers as used in aromatic emulsions. Mention will be made of dammar gum, wood resins of the ester gum type, sucrose acetate isobutyrate (SAIB) or brominated vegetable oils. The function of these weighting agents is to adjust the density of the fluid core.

The core or the shell may also comprise one or more sweeteners, which may be provided in the form of a solution or suspension in ethanol. Examples of suitable sweeteners may be, but is not limited to, aspartame, saccharine, NHDC, sucralose, acesulfame, neotame, etc.

The core may also comprise one or more "sensate" aromatic agents, which provide either a freshening effect or a hot effect in the mouth. Suitable freshening agents may be, but are not limited to, menthyl succinate and derivatives thereof, in particular Physcool® marketed by the Applicant. A suitable hot effect agent may be, but is not limited to, vanillyl ethyl ether.

The flavoring agents that can be solubilized in the solvent of the core of the capsule include, but are not limited to, natural or synthetic aromas and/or fragrances. Examples of suitable fragrances are fruity, confectionery, floral, sweet, woody fragrances. Examples of suitable aromas are vanilla, coffee, chocolate, cinnamon, mint.

According to an embodiment of the invention, the total weight of the capsule is in the range of between 5-60 mg, preferably 10-50 mg, more preferably 20-40 mg.

The invention also relates to a breakable capsule suitable for being incorporated in the fitter of a smoking device, which is substantially moisture stable. "Substantially moisture stable" means that the outer shell or outer coating of the capsule has the ability to retard degradation of the capsule due to the water brought into the smoking device by a smoker.

The breakable capsule according to the invention comprises a core as described hereinbefore, and a shell, said capsule presents a crush strength from 0.5 to 2.5 kp, and keeps a crush strength from 0.5 to 2.5 kp and a deformation of less than two third of its diameter after having been submitted to the smoking test A.

According to the invention, the hereabove described technical features of the breakable capsule within the smoking device are those of the breakable capsule of the invention as such.

According to a preferred embodiment, the capsule of the invention is a seamless capsule, obtained trough a co-extrusion process. The co-extrusion process is a synchronous extrusion of two liquids: the external and hydrophilic liquid phase, and the internal and lipophilic liquid phase. The co-extrusion process comprises three main stages: compound drop formation, shell solidification and capsule collection. The compound drop is a sphere of the liquid fill phase inside the shell phase. The liquid fill phase is hereinafter referred to as "the core". The shell phase is hereinafter referred to as "the shell". The capsules of the invention may be produced by any suitable co-extrusion process. Preferably, the capsules are produced by an apparatus and a process as described in EP 513603, the disclosure of which is herein incorporated by reference.

According to an embodiment of the invention, after the co-extrusion step, the solidification step is performed by keeping cold the capsules in order to ensure correct gelling of the shell for example by contacting them with a cold bath. The cold bath is preferably cold oil. By cold in the meaning of this invention, is meant a temperature of between 1 and 15° C., preferably 2 and 10° C., more preferably of between 4 and 6° C.

The capsules may then be centrifuged in order to remove the surplus oil, optionally washed with organic solvent (such as acetone, ethyl acetate, ethanol, petroleum ether, etc.) also to remove the surplus oil, and dried.

According to one embodiment of the invention, after the co-extrusion step, and eventually the solidification step, the capsules are centrifuged.

According to another embodiment of the invention, the capsules are co-extruded, centrifuged and optionally immersed into a solution or an emulsion containing a curing agent.

The curing agent may also be ethanol or any other anhydrous organic solvent, such as ethyl acetate or isopropanol, maintained at a temperature of between 0 and 25° C., more particularly between 10 and 20° C.

The curing agent can alternatively or also be a bath of calcium ions, for example of calcium chloride, dicalcium phosphate or calcium sulfate or a bath of acid containing calcium ions of pH less than 5, preferably of 3 to 4. Examples of acids may be adipic acid, fumaric acid, gluconic acid or glucono-delta-lactone. The calcium ion or acid bath is preferably at a temperature of 0 to 25° C., preferably 10 to 20° C.

The effect of the immersion step is to wash out the oil remaining at the periphery of the capsule, and to gradually strengthen the shell, notably through dehydration and osmotic equilibrium.

According to an embodiment of the invention, after immersion, the capsules are dried in a current or air at controlled temperature and humidity. The relative humidity of the drying air is 20% to 60%, preferably 30 to 50%; the temperature of the drying air is of 15 to 60° C., preferably 35 to 45° C.

According to an embodiment of the invention, the capsules can be obtained using the following method: co-extrusion of the external and hydrophilic liquid phase on the one hand, and of the internal and lipophilic liquid phase and components of the core on the other hand, optionally centrifugation, optionally immersion of the capsules so obtained in a bath of calcium ions or acid, optionally followed by drying.

According to another embodiment, the process according to the invention further comprises a coating step during which the moisture barrier outer layer is applied on the capsules. Preferably, said coating step is performed by dipping the capsules in a coating solution, or by spraying a coating solution onto the capsules. Said coating step is preferably performed after the drying step.

The capsules manufactured by means of the process of the invention are essentially or perfectly spherical and very homogeneous in size.

The invention is hereunder illustrated by the following examples, which should not be considered as limiting the scope of the invention, and shall be read with reference to the figures.

EXAMPLES

Example 1

Two types of capsules presenting the same size are prepared by co-extrusion as disclosed in patent EP 513603. The composition of capsules according to the present invention, referenced as 1004/H11 (having less than 80% gelatin and including gellan gum) is given in Table 1 below, and the composition of prior art capsules containing 80% gelatin, referenced 1004/C30, is given in Table 2 below.

Weight of each capsule: 20.56 mg, in which weight of the shell: 3.68 mg (17.89%)

weight of the core: 16.88 mg (82.11%)

TABLE 1

Capsules 1004/H11

|  | %/total weight | %/dry matter |
|---|---|---|
| External liquid phase <br> Dry matter: 15.5% | | |
| Gellan gum Kelco F | 1.800% | 11.62% |
| Gelatin 260A | 4.000% | 25.82% |
| Sorbitol | 1.000% | 6.46% |
| Glycerol | 0.500% | 3.23% |
| Dextrin Cristal Tex T648 | 8.000% | 51.65% |
| Sodium bicarbonate | 0.180% | 1.16% |
| brilliant blue FD&C#1 | 0.010% | 0.06% |
| processing water | 84.510% | |
|  | 100.000% | 100% |
| Internal liquid phase | | |
| Ethanol | 6.0000% | |
| Mygliol | 65.5000% | |
| Menthol | 28.5000% | |
| Total | 100.0000% | |

TABLE 2

Capsules 1004/C30

|  |  | %/total weight | %/dry matter |
|---|---|---|---|
| External liquid phase <br> Dry matter: 24.5% | | | |
| Gelatin 260A | | 19.800 | 80.82 |
| Sorbitol | | 2.7000 | 11.02 |
| Caramel color | | 2.000 | 8.16 |
| processing water | | 75.500 | |
|  | | 100.000% | 100% |
| Internal liquid phase | | | |
| Ethanol | | 5.0000 | |
| Mygliol 812S | | 87.0000 | |
| Spearmint flavor #831661 supplied by MANE | | 8.0000 | |
| Total | | 100.0000% | |

Capsules 1004/C30 and capsules 1004/H11 present a diameter of respectively 3489+/−40 and 3394+/−35 μm.

The crush strength of the capsules is measured as follows using a LLOYD-CHATILLON Digital Force Gauge—Model DFIS 50

Capacity=25 Kgf (50 lb)

Resolution=0.02 Kgf (0.05 lb)

Accuracy=+/−0.15%

Sampling Rate=1000 times per second

Methodology:

Force Gauge is attached to a stand.

The capsule is positioned in the middle of a plate that is moved up with a manual thread screw device. Pressure is then applied manually and once the capsule wall fails, the gauge records the maximum force applied prior to rupture (measure in Kg or in lb). Sample of 10 to 20 capsules is measured.

The results are as follows:

| capsules | Crush strength (Kp) | Standard deviation |
|---|---|---|
| 1004/C30 | 4.60 | 1.11 |
| 1004/H11 | 1.70 | 0.26 |

Figure 1:
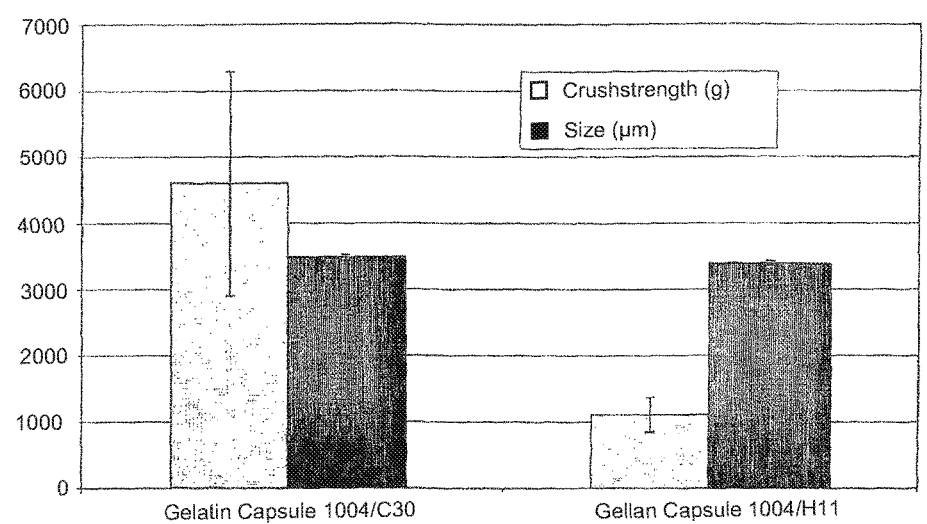
FIG. 1 is a diagram comparing the crush strength of a capsule having for sole hydrocolloid gelatin (herein referred to as "the gelatin capsule", and a capsule of the invention.
Figure 2:
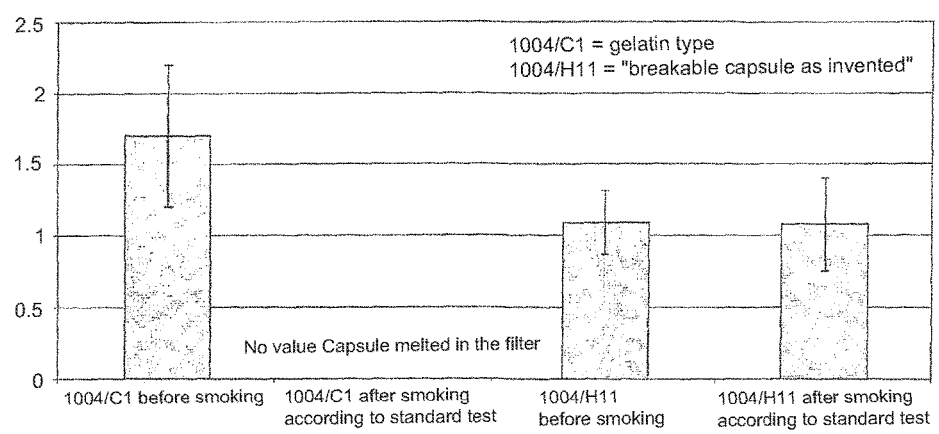
FIG. 2 is a diagram comparing the crush strength of a capsule having for sole hydrocolloid gelatin (herein referred to as "the gelatin capsule", and a capsule of the invention after smoking.

The results are also represented on FIG. 1.

Example 2

Capsules are prepared according to example 1.

Core content is about 89% and shell content is about 11%, corresponding to a thickness of dried shell of about 50 microns. Capsules are then dried to obtain 3.5 mm spherical capsules with a crush-strength of 1 kp. Average weight of capsule is about 20 mg.

A prior art capsule containing gelatin (ref 1004/C1) which 72% gelatin as sole hydrocolloid, and a capsule as described in example 1 above are incorporated into a cavity filter of a cigarette. Crush strength value Ci is measured for both capsules according to the herein described method.

The obtained cigarettes are then smoked on a smoking machine (smoking test A) according to international standard procedure. Filters containing the capsules are collected and capsules are extracted from the filter to measure crush strength value Cf after smoking process.

In the case of gelatin capsules, capsules have melted into the filter during the smoking process and crush strength value is not measurable. Capsules are deformed and cannot burst when press on them. Gellan-including capsule, on the contrary, still burst when pressure on the filter.

Weight of each capsule: 20.57 mg, in which weight of the shell: 2.37 mg (11.51%)

weight of the core: 18.20 mg (88.49%)

Instrumentation:

Smoking Machine HEINR BORGWALDT RM 4/cs

The cigarettes containing breakable capsules are positioned on the smoking machine as standard position used for other type of analysis. The adjustable parameters are set up as follows:

Puff volume: 35 ml (as defined in internationally standard method for smoking machine)

Putt period: 60 seconds

Puff duration: 2 seconds

Puff sweep time: 1.8 second

Exhaust sweep time: 1 second

Crush strength are measured according to the procedure described in example 1 above.

Capsules 1004/C1

| Components | | Internal liquid phase <br> Dry matter: 25.0% % | %/dry matter |
|---|---|---|---|
| Gelling agent | Gelatin | 18.000% | 72.00% |
| Plasticizer | Sorbitol | 4.000% | 16.00% |
| filler | Calcium Carbonate | 1.000% | 4.00% |
| Color | Caramel | 2.000% | 8.00% |
| Solvent | water | 75.000% | |
| Total | | 100.000% | 100% |

-continued

| Internal liquid phase | | |
|---|---|---|
| Name | | % |
| Solubilising agent | Ethanol | 5.0000% |
| carrier | Miglyol | 87.0000% |
| Aroma | Spearmint flavor #831661 supplied by MANE | 8.0000% |
| | Total | 100.0000% |

The results are as follows:

| capsules | Crush strength Ci | Crush strength Cf |
|---|---|---|
| 1004/C1 | 1.70 kp | Not measurable (capsule has melted) |
| 1004/H11 | 1.2 kp | 1.2 kp |

After smoking, prior art capsules are no longer breakable.

Example 3

Capsules are prepared according to example 1, using the following composition:
Capsules 1004/H6

| External liquid phase Dry Matter: 16.5% | | | |
|---|---|---|---|
| Components | | % | %/dry matter |
| gelling agent 1 | Gellan gum | 2.200% | 13.33% |
| gelling agent 2 | Gelatin | 4.000% | 24.24% |
| filler | Dextrin CT648 | 10.000% | 60.61% |
| acid or salt | Sodium bicarbonate | 0.200% | 1.21% |
| Color | brilliant blue FD&C #1 | 0.10% | 0.61% |
| Solvent | Osmosed water | 83.500% | |
| Total | | 100.000% | |

| Internal liquid phase | | |
|---|---|---|
| components | | % |
| Solubilizing agent | Ethanol | 5.0000% |
| carrier | Miglyol 812S | 90.0000% |
| aroma | Spearmint flavor | 5.0000% |
| | Total | 100.0000% |

Weight of each capsule: 20.96 mg in which:
  weight of the shell: 3.72 mg (17.74%)
  weight, of the core: 17.24 mg (82.26%)
  One capsule was introduced in a cavity of a cigarette filter. Crush strength Ci was measured according to the procedure described in example 1 above.

$Ci=0.80+/-0.20$ Kp

Then the cigarette was submitted to Test A as described in example 2 above, for 8 puffs. After 8 puffs, the capsule breaks with an audible 'pop'.

The invention claimed is:

1. A process for manufacturing seamless breakable capsules, each comprising a core and a shell, said process comprising the steps of:
   (A) co-extruding an external and hydrophilic liquid phase and an internal and lipophilic liquid phase, thereby forming seamless capsules, each having a core comprising the internal and lipophilic phase and a shell comprising the external and hydrophilic phase,
   (B) solidifying and/or gellifying the surface of the shell under cold conditions,
   (C) drying the capsules,
   (D) recovering seamless breakable capsules, wherein said seamless breakable capsules:
      (i) have an initial crush strength Ci from 0.5 to 2.5 kp and keep a crush strength Cf from 0.5 to 2.5 kp after having been submitted to the smoking test A, and
      (ii) present a deformation of less than two third of its diameter prior to rupture after having been submitted to the smoking test A.

2. The process for manufacturing seamless breakable capsules according to claim 1, wherein after the co-extrusion step (A), the capsules are centrifuged, after or before the solidification step (B).

3. The process for manufacturing seamless breakable capsules according to claim 1 comprising a further step of immersing the capsules into an organic liquid or an emulsion containing a curing agent.

4. The process for manufacturing seamless breakable capsules according to claim 3, wherein the curing agent is an anhydrous organic solvent or a solution comprising bivalent ions.

5. The process for manufacturing seamless breakable capsules according to claim 4, wherein the bivalent ions are calcium ions.

6. The process for manufacturing seamless breakable capsules according to claim 1, wherein the seamless capsules obtained at the end of step (B) are washed with an organic solvent before the drying step (C).

7. The process for manufacturing seamless breakable capsules according to claim 1, wherein the capsules obtained at the end of the drying step (C) are coated with at least one moisture barrier outer layer.

8. The process for manufacturing seamless breakable capsules according to claim 7, wherein the at least one moisture barrier outer layer is applied by dipping the capsules in a coating solution or by spraying a coating solution onto the capsules.

9. The process for manufacturing seamless breakable capsules according to claim 7, wherein the at least one moisture barrier outer layer comprises one member selected from the group consisting of waxes, shellac, ethylcellulose, hydroxypropyl methylcellulose, latex composition, polyvinyl alcohol and combinations thereof.

10. The process for manufacturing seamless breakable capsules according to claim 1, wherein the external and hydrophilic liquid phase comprises from 4% to 75% w/w of the total dry weight of said external and liquid phase of at least one hydrocolloid.

11. The process for manufacturing seamless breakable capsules according to claim 1, wherein said hydrocolloid is selected from the group consisting of gellan gum, agar, alginates, carrageenans, pectins, arabic gum, ghatti gum, pullulan gum, mannan gum and modified starch, alone or as a mixture thereof or in combination with gelatin.

12. The process for manufacturing seamless breakable capsules according to claim 1, wherein the recovering step (D) comprises recovering seamless breakable capsules, each having an outer diameter in the range of 2 to 8 mm.

13. The process for manufacturing seamless breakable capsules according to claim 1, wherein the recovering step (D) consists in recovering seamless breakable capsules, each of which having a shell with a thickness in the range of 10 to 500 microns.

14. The process for manufacturing seamless breakable capsules according to claim 1, wherein the cold conditions at step (B) consist in immersing the capsules obtained at the end of step (A) in a cold bath at a temperature of between 1° C. and 15° C.

15. The process for manufacturing seamless breakable capsules according to claim 14, wherein the cold bath is at a temperature of between 2° C. and 10° C.

16. The process for manufacturing seamless breakable capsules according to claim 1, wherein the internal and lipophilic phase forming the core of each of the capsules comprises an aromatic agent.

17. The process for manufacturing seamless breakable capsules according to claim 1, wherein the internal and lipophilic phase forming the core of each of the capsules includes a solvent.

18. The process for manufacturing seamless breakable capsules according to claim 17, wherein the internal and lipophilic phase forming the core of each of the capsules includes medium chain triglyceride as a solvent.

19. A process for manufacturing seamless breakable capsules, each comprising a core and a shell, said process comprising the steps of:
(A) co-extruding an external and hydrophilic liquid phase and an internal and lipophilic liquid phase, said external and hydrophilic liquid phase comprising from 4% to 95% w/w of the total dry weight of said external and liquid phase of at least one hydrocolloid, thereby forming seamless capsules, each having a core comprising the internal and lipophilic phase and a shell comprising the external and hydrophilic phase,
(B) solidifying and/or gellifying the surface of the shell under cold conditions,
(C) drying the capsules,
(D) recovering seamless breakable capsules,
wherein said seamless breakable capsules:
(i) have an initial crush strength Ci from 0.5 to 2.5 kp and keep a crush strength Cf from 0.5 to 2.5 kp after having been submitted to the smoking test A, and
(ii) present a deformation of less than two third of its diameter prior to rupture after having been submitted to the smoking test A.

20. A process for manufacturing seamless breakable capsules, each comprising a core and a shell, said process comprising the steps of:
(A) co-extruding an external and hydrophilic liquid phase and an internal and lipophilic liquid phase, said external and hydrophilic liquid phase comprising from 4% to 95% w/w of the total dry weight of said external and liquid phase of at least one hydrocolloid selected from the group consisting of gellan gum, carrageenan, alginates and mixtures thereof, thereby forming seamless capsules, each having a core comprising the internal and lipophilic phase and a shell comprising the external and hydrophilic phase,
(B) solidifying and/or gellifying the surface of the shell under cold conditions,
(C) drying the capsules,
(D) recovering seamless breakable capsules, wherein said seamless breakable capsules:
(i) have an initial crush strength Ci from 0.5 to 2.5 kp and keep a crush strength Cf from 0.5 to 2.5 kp after having been submitted to the smoking test A, and
(ii) present a deformation of less than two third of its diameter prior to rupture after having been submitted to the smoking test A.

* * * * *